United States Patent
Liu et al.

(10) Patent No.: US 7,802,034 B2
(45) Date of Patent: Sep. 21, 2010

(54) METHOD FOR PERFORMING FULL TRANSFER AUTOMATION IN A USB CONTROLLER

(75) Inventors: Baojing Liu, San Jose, CA (US); Radhakrishnan Nair, Fremont, CA (US); Paul Lassa, Mountain View, CA (US)

(73) Assignee: SanDisk Corporation, Milpitas, CA (US)

( * ) Notice: Subject to any disclaimer, the term of this patent is extended or adjusted under 35 U.S.C. 154(b) by 0 days.

(21) Appl. No.: 11/618,865

(22) Filed: Dec. 31, 2006

(65) Prior Publication Data

US 2008/0162753 A1 Jul. 3, 2008

(51) Int. Cl.
*G06F 13/12* (2006.01)
*G06F 13/38* (2006.01)

(52) U.S. Cl. .......................................... 710/62
(58) Field of Classification Search ................ 710/62
See application file for complete search history.

(56) References Cited

U.S. PATENT DOCUMENTS

| | | | |
|---|---|---|---|
| 6,370,603 B1 | 4/2002 | Silverman et al. | |
| 6,718,412 B2 | 4/2004 | Purcell et al. | |
| 6,757,776 B1 | 6/2004 | Pew | |
| 6,792,501 B2 | 9/2004 | Chen et al. | |
| 6,928,505 B1 | 8/2005 | Klingman | |
| 6,947,085 B1 * | 9/2005 | Booth, Jr. | 348/302 |
| 7,035,948 B1 | 4/2006 | Liang et al. | |
| 7,069,370 B2 | 6/2006 | Sukegawa et al. | |
| 7,069,373 B2 * | 6/2006 | Teng | 710/310 |
| 2001/0056513 A1 | 12/2001 | Ueda | |
| 2004/0243906 A1 * | 12/2004 | Huang | 714/758 |

OTHER PUBLICATIONS

"Universal Serial Bus Specification (révision1.1)" Internet Citation, Sep. 23, 1998, URL: www.usb.org> XP002167362.
Turn R: "Hardware-software Tradeoffs In Reliable Software Development" 11$^{th}$ Asilomar Conference on Circuits, Systems and Computers, 1977, Nov. 7, 1977, pp. 282-288, XP010299617, p. 283, col. 2, line 50- p. 284, col. 2, line 58.
International Search Report mailed Mar. 28, 2008 for International Application No. PCT/US2007/025866.
Written Opinion of the International Searching Authority mailed on Mar. 28, 2008 for International Application No. PCT/US2007/025866.

* cited by examiner

*Primary Examiner*—Alford W Kindred
*Assistant Examiner*—Zachary K Huson
(74) *Attorney, Agent, or Firm*—Brinks Hofer Gilson & Lione

(57) ABSTRACT

A USB controller and method of implementing a full transfer automation mode is described. The USB controller may have a host interface module configured to generate hardware logic signals for communication to a backend module having buffer memory. The backend module may be configured to generate hardware logic signals for communication with the host interface module such that data transfer within the USB device may be implemented without the need for processor intervention to handle routing of data packets during a USB bulk data transfer.

41 Claims, 7 Drawing Sheets

METHOD FOR PERFORMING FULL TRANSFER AUTOMATION IN A USB CONTROLLER

TECHNICAL FIELD

This application relates to Universal Serial Bus (USB) data transfer architecture and methods. More specifically, this application relates to USB data transfer architecture and methods for increasing data throughput in USB peripheral devices.

BACKGROUND

USB peripheral devices, such as data storage devices containing non-volatile memory, are commonly used in home and business computing environments for reliable data storage in a compact and portable package. This type of USB peripheral device may include a USB controller that utilizes a protocol handler to interface with a USB physical layer (PHY) device and a backend circuit that communicates with flash memory. When a host connected via the USB connector of the USB device wishes to write data to, or read data from, the USB device, the commands and data are presented with the appropriate USB protocols and in the appropriate formats according to an agreed upon standard. The USB standards are designed with theoretical maximum data transfer rates. Although the USB standard will theoretically support these maximum data rates, the performance of USB data storage devices may not actually achieve the maximum data rates due to limitations of the storage medium and associated circuitry.

A USB controller in a USB data storage device manages the transfer of data to and from the USB data storage device. Typically, the data is transferred in batches of a known length and handshaking messages are exchanged between the host and the USB device to manage tiring and error checking during data transfer. One way to handle the data exchange in the USB peripheral device is for the USB controller to execute a number of firmware instructions on an internal microprocessor in response to processor interrupts generated as each of the batches of data is moved to or from buffers. Firmware involvement, however, can significantly impact data transfer performance. Each interrupt will delay other activities the internal microprocessor may be engaged in, or wake the microprocessor up from any temporary sleep or idle mode, and likely require time to identify, interpret and act on firmware instructions related to the interrupt. Accordingly, microprocessor activity in a USB controller can slow down the achievable data transfer rate and increase power consumption in the USB device.

SUMMARY

In order to address the need for an improved USB controller architecture and method of transferring data, a USB controller with full transfer automation that can reduce or avoid the use of firmware and microprocessor overhead during certain data transfer functions is set forth.

According to a first aspect, a method of implementing full transfer automation in a Universal Serial Bus (USB) controller is disclosed. The method includes receiving a USB bulk data transfer initiation message at the USB controller from a host and transferring data packets during a USB bulk data transfer operation. Hardware generated logic signals are exchanged between a host interface module and a backend module of the USB controller during a data transfer phase of the bulk data transfer operation, relating to a data transfer status within the USB controller. In one implementation, exchanging hardware generated logic signals may include generating at least one backend hardware logic signal in a backend module of the USB controller indicative of a readiness of a buffer memory to transfer data in or out of a mass storage media during the USB bulk data transfer operation. In addition, exchanging hardware generated logic signals may include generating at least one host interface module hardware logic signal in a host interface module of the USB controller so that, during a USB bulk data transfer read or write operation, the backend module and host interface module are configured to communicate with each other relating to the data transfer status within the USB controller.

In another aspect, a method of implementing full transfer automation in a Universal Serial Bus (USB) controller includes receiving a USB bulk data transfer initiation message for a USB bulk transfer write operation at the USB controller and initializing a full transfer automation mode within the USB controller. Data packets are received from the host at the USB controller during the USB bulk transfer write operation and hardware generated logic signals are exchanged between a host interface module and a backend module of the USB controller relating to a data transfer status within the USB controller while receiving the data packets.

In yet another alternative implantation, a method of implementing full transfer automation in a Universal Serial Bus (USB) controller is disclosed where a USB bulk data transfer initiation message for a USB bulk transfer read operation is received at the USB controller from a host and the USB controller initiates a full transfer automation mode within the USB controller. During the bulk transfer read operation, the full transfer automation mode may include transmitting data packets to the host from the USB controller and exchanging hardware generated logic signals between a host interface module and a backend module of the USB controller regarding data transfer status within the USB controller while transmitting the data packets.

Other features and advantages of the invention will become apparent upon review of the following drawings, detailed description and claims.

DETAILED DESCRIPTION

Figure 1:
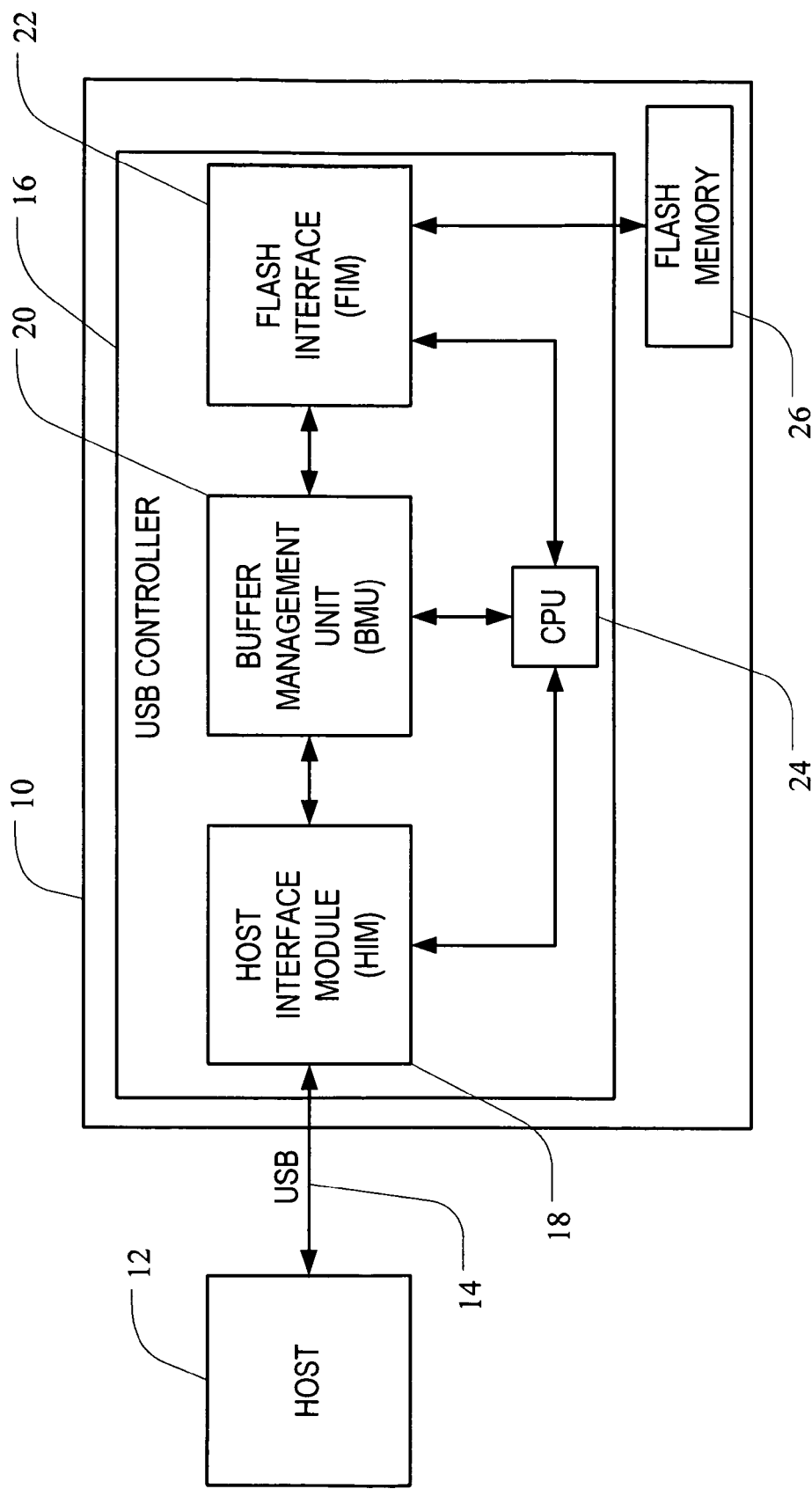
FIG. 1 is a block diagram of a USB peripheral device connected with a host.

FIG. 1 illustrates a block diagram of a universal serial bus (USB) peripheral device 10 connected with a host 12 via a USB communication line 14. The host 12 may be a USB port of a personal computer or any electronic component with USB capability, for example MP3 players, cell phones, etc. The USB communication line 14 may be a direct USB connection of the USB peripheral device 10 to the host 12 via a standard USB connector, or may include intervening USB functions, such as a hub. As shown in FIG. 1, the USB peripheral device 10 may be a flash memory thumb drive configured for mass data storage. The USB peripheral device includes a USB controller 16 consisting of a host interface module (HIM) 18, a buffer management unit (BMU) 20, a flash memory interface module (FIM) 22 and a central processing unit (CPU) 24. The USB controller 16 communicates with the USB communication line 14 outside of the USB peripheral device 10 and also with the flash memory 26 contained within the USB peripheral device 10. Although one or more components of the USB controller 16 may be configured as discrete components, in one embodiment the HIM 18, BMU 20, FIM 22, and CPU 24 are all formed on a single application specific integrated circuit (ASIC). Also, although flash memory is illustrated, other non-volatile memory or mass storage media are contemplated.

Figure 2:
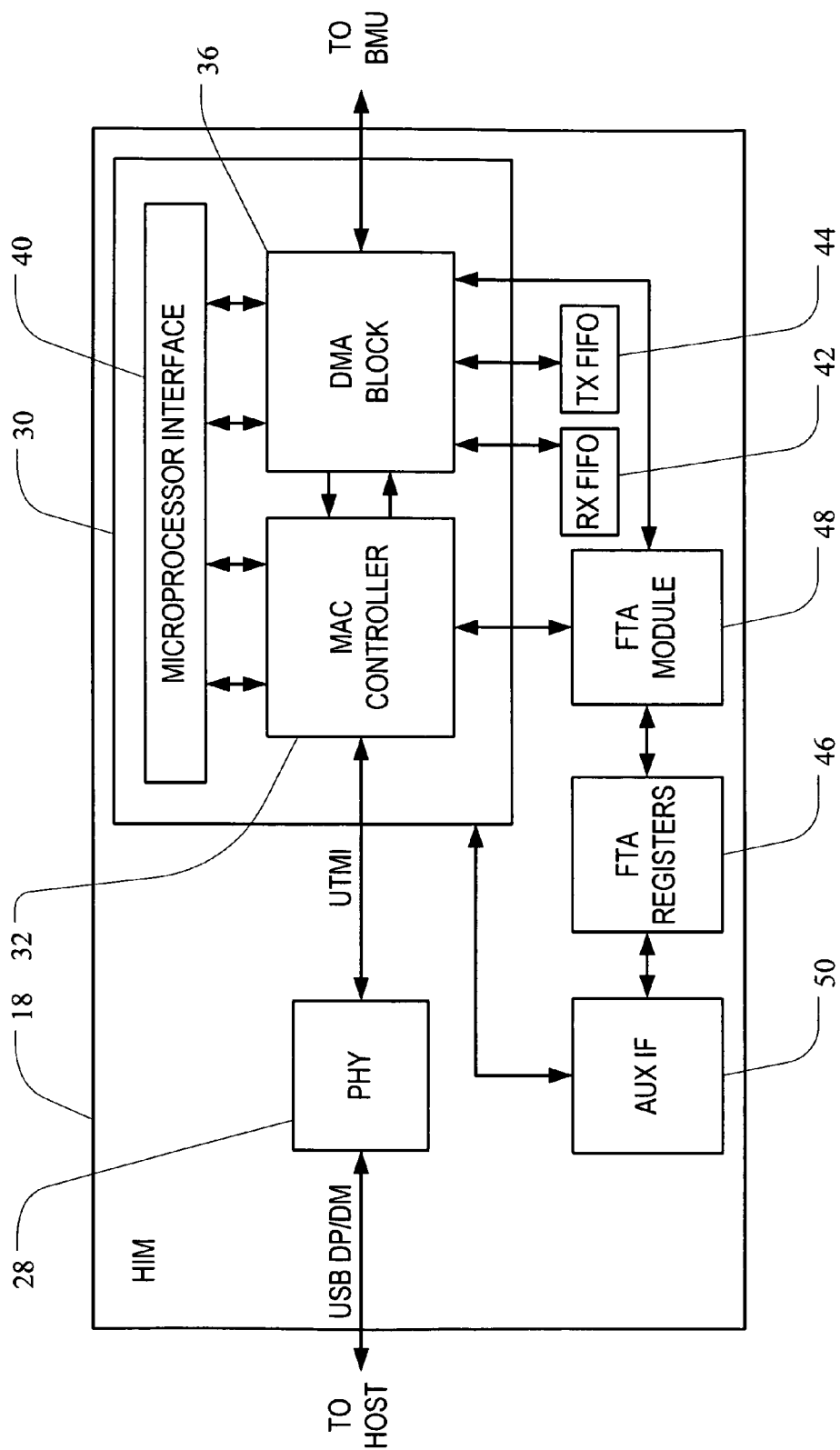
FIG. 2 is a block diagram of a host interface module in the USB peripheral device of FIG. 1.

Referring now to FIG. 2, the HIM 18 is shown in greater detail. The HIM 18 includes a physical layer interface 28, such as a USB 2.0 physical interface for interfacing with USB serial bus data lines on one side and with a UTMI interface on the other side. The physical layer interface 28 extracts clock information and data from the serial stream, checks for errors in received data, performs NRZI decoding, bit un-stuffing, serial-to-parallel conversion and then sends this data to the USB device core 30. The physical layer interface 28 also performs the reverse function, translating data received from the USB device core 30 in a UTMI parallel data format to the USB serial data format. In one implementation, the UTMI transmission may be a parallel 30 MHz 16 bit bus. In other implementations, any of a number of digital interface standards for USB applications, such as UTMI+ or ULPI may be used in place of UTMI. The physical layer interface 28 may be implemented with any of a number of USB 2.0 PHY IP core arrangements such as those available from Chipidea Microelectrónica S.A. of Lisbon, Portugal. Also, the physical layer interface 28 may support the high speed (480 Mbps), full speed (12 Mbps) and low speed (1.5 Mbps) data transfer rates in compliance with the USB 2.0 specification.

The USB device core 30 includes a media access control (MAC) controller 32 and a direct memory access (DMA) block 36. Each communicate with the CPU 24 via a microprocessor interface 40 to allow the CPU 24 to read and write to the USB device core 30 registers, to setup and trigger USB transactions and to respond to transaction events and status changes reported by the USB device core 30. The MAC controller 32 communicates with the physical layer interface 28 over the UTMI data path, parses all USB tokens received from a host and generates response packets. Additionally, the MAC controller 32 also is responsible for all error checking, check fill generation, USB handshake formats, ping and data response packets, and any signals that must be generated based on a USB timing requirement.

The DMA block 36 communicates with the MAC controller 32 and is responsible for moving all of the data to be transferred to and from the flash memory 26 in the USB peripheral device 10 between the USB device core and the buffer RAM (BRAM) in the BMU 20. In one implementation, the DMA block 36 communicates over a USB full transfer automation (FTA) interface with the BMU 20 in the USB peripheral device 10 to exchange hardware logic generated handshake signals when managing data transfers, such as USB bulk data in or out transfers (also referred to as bulk data read or write transfers, respectively). A data bus connection, such as a BVCI interface, connects the DMA block 36 with the CPU 24. Additionally, the DMA block 36 maintains context information and builds configurable FIFO buffers 42, 44 between the MAC controller 32 and the DMA block 36. These FIFO's decouple the system processor memory bus request from the tight timing required by the USB protocol itself and balance out differences in internal clock frequencies that affect the timing of data transfer between the DMA block 36 and the MAC controller 32. Multiple FIFO channels may be maintained for each of the active endpoints in the system. The size of the TX and RX FIFO buffers is determined based on the number of device endpoints supported and the worst case latency to acquire the bus and fetch a block of data.

In one implementation, the USB core 30 may be an IP core from Chipidea Microelectrónica S.A. of Lisbon, Portugal. Any of a number of other IP cores from other USB IP core providers may also be used. The HIM 18 also includes FTA registers 46 and an FTA logic module 48. The FTA registers 46 are configured to receive set up information for enabling a full transfer automation mode where, as describe in greater detail below, the USB controller 16 can utilize hardware generated logic signals, rather than CPU activity via interrupts and firmware instructions, to manage movement of data blocks to and from BRAM. The FTA registers also maintain information such as current transfer status as hardware generated logic signals increment the number of completed data block transfers in an expected bulk data transfer. The FTA module 48 contains hardware logic for generating internal handshake signals when the USE controller 16 is operating in an FTA mode. An auxiliary interface 50 may contain auxiliary registers having firmware for use by the processor to handle various tasks such as CPU sleep or wake-up routines.

Figure 3:
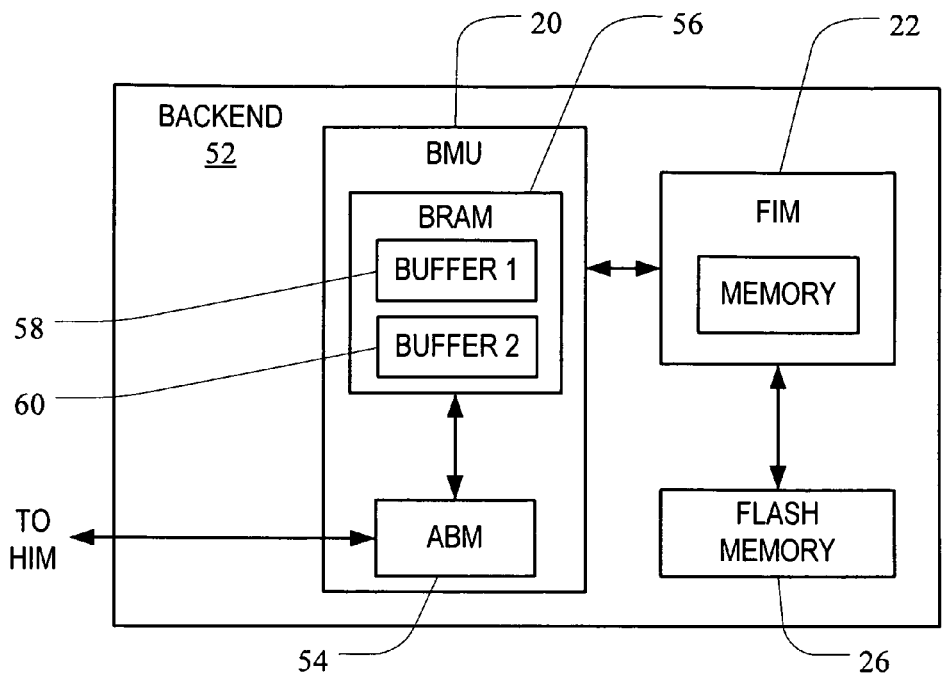
FIG. 3 is a block diagram of a backend of a USB controller suitable for use in the USB peripheral device of FIG. 1.

FIG. 3 illustrates the remaining portions of the USB controller 16, and the flash memory 26 of the USB peripheral device 10, the combination of which is herein referred to as the backend 52 of the USB peripheral device 10, is shown. The buffer management unit (BMU) 20 may include an automatic buffer manager (ABM) 54 in communication with BRAM 56. The BRAM 56 may be partitioned in multiple ways, for example to provide first and second buffers 58, 60 for transmitting or receiving data packets, such as 512 byte blocks in USB high speed applications, of bulk data transfer to be written to, or read from, flash memory 26. The BMU 20 communicates with a flash interface module (FIM) 22 which mediates between the BMU 20 and the flash memory 26.

In order to implement full transfer automation in the USB peripheral device 10 and, accordingly, assist in increasing data speed and reducing power consumption, the USB peripheral device 10 includes several modifications to standard USB controller architecture to provide for additional internal handshaking in the USB controller 16 using hardware logic. These additional internal handshaking messages for communicating between the HIM 18 and the backend 52 may be implemented in hardware logic in the controller to remove the need for certain traditionally firmware implemented steps requiring the involvement of the CPU 24.

The USB standard supports four transfer/endpoint types: control transfers, interrupt transfers, isochronous transfers, and bulk transfers. As noted below, bulk transfers involve large bursts of data that are handled in fixed length blocks and can benefit most from the full transfer automation described herein. In one implementation, the USB controller 16 only invokes the full transfer automation described herein during a bulk data transfer task and utilizes any of a number of standard or known CPU-based transfer mechanisms for isochronous, control or interrupt endpoints.

Figure 4:
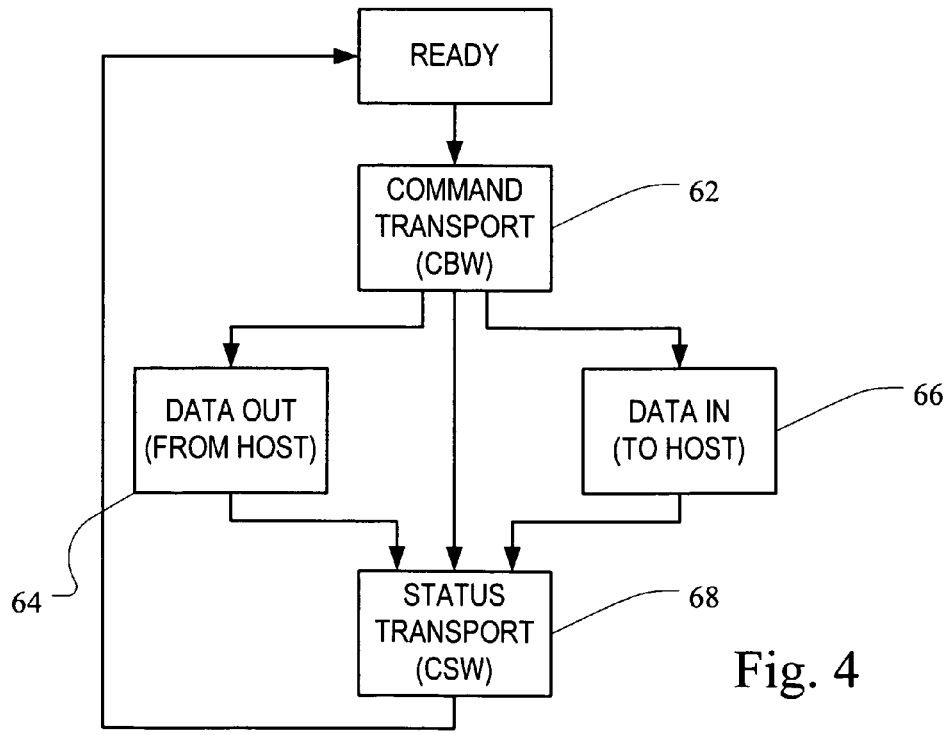
FIG. 4 is a flow diagram of a USB bulk transfer operation.

With respect to bulk data transfers under the USB standard, three phases are provided as illustrated in FIG. 4. In a first phase, a CBW (Command Block Wrapper) message is sent by the host 12 to the USB peripheral device 10 and placed into the BRAM 46 of the buffer management unit 20 (at step 62). The CBW message is 31 bytes and includes information regarding the type of transfer that the USB peripheral device 10 is to perform. Upon receiving the CBW message, firmware in the USB peripheral device, for example in the main RAM (MRAM) of the CPU 24 reads this message and writes data to full transfer automation (FTA) registers 46 in the HIM 18. Discussed in more detail below, the FTA registers 46 include information such as the starting address in the BRAM 56, buffer size and the direction of transfer. After the CBW phase, the data phase of the bulk data transfer takes place and the host 12 sends packets of data to (a bulk out transfer or write operation), or receives data packets from (a bulk in transfer or read operation), the USB peripheral device 10 depending on the direction of transfer indicated in the CBW message (at steps 64, 66). The final phase of the USB bulk data transfer is the CSW (Command Status Wrapper) message that concludes the exchange between the host 12 and the USB peripheral device 10 (at step 68).

Figure 5:
FIG. 5 is a register table of data prepared for facilitating full transfer automation in the USB peripheral device of FIGS. 1-3.

Referring to FIG. 5, upon receipt of a CBW message from a host 12 in the first phase, the CPU executes firmware to write data to the FTA registers 46 data necessary to implement the FTA procedure. The table of registers 76 in FIG. 5 includes a memory unit address 78 representing the memory unit of the circular buffer (BRAM), a circular buffer base address 80, end address 82 and containing the word address of the BRAM base and end addresses. Current address 84 is updated by hardware while FTA transfer goes on, to point to the memory location currently involved in the transfer. The FTA register table 76 also includes transfer size 86, in terms of the total number of blocks (data packets) expected. Current transfer size 88 is a field updated by hardware during an ongoing FTA transfer that keeps track of how many data packets have already been transferred. A transfer descriptor link list base address 90 contains the word base address of the data transfer descriptor (dTD) link list, transfer automation control for transmit (Tx) 92 and receive (Rx) 94 automation contain information that controls the transfer automation feature on an endpoint basis, and the endpoint transfer complete register 96 indicates the status of the end of a bulk out transfer (data out from the host) or a bulk data in transfer (data into the host) after all data packets have been transferred. The endpoint MISC control 98 includes instructions for forcing the USB device core 30 to respond with an acknowledgement (ACK) token during an out transfer from the host. The stop transfer control 100 register includes a control bit to stop the full transfer automation process and transfer automation of status 102 contains status of hardware updates as each data transfer descriptor and data queue header setup is completed. The Tx FIFO low mark configuration register 104 defines the threshold for initiating pre-fetch to the TX FIFO register for a read(IN) transfer.

Figure 6:
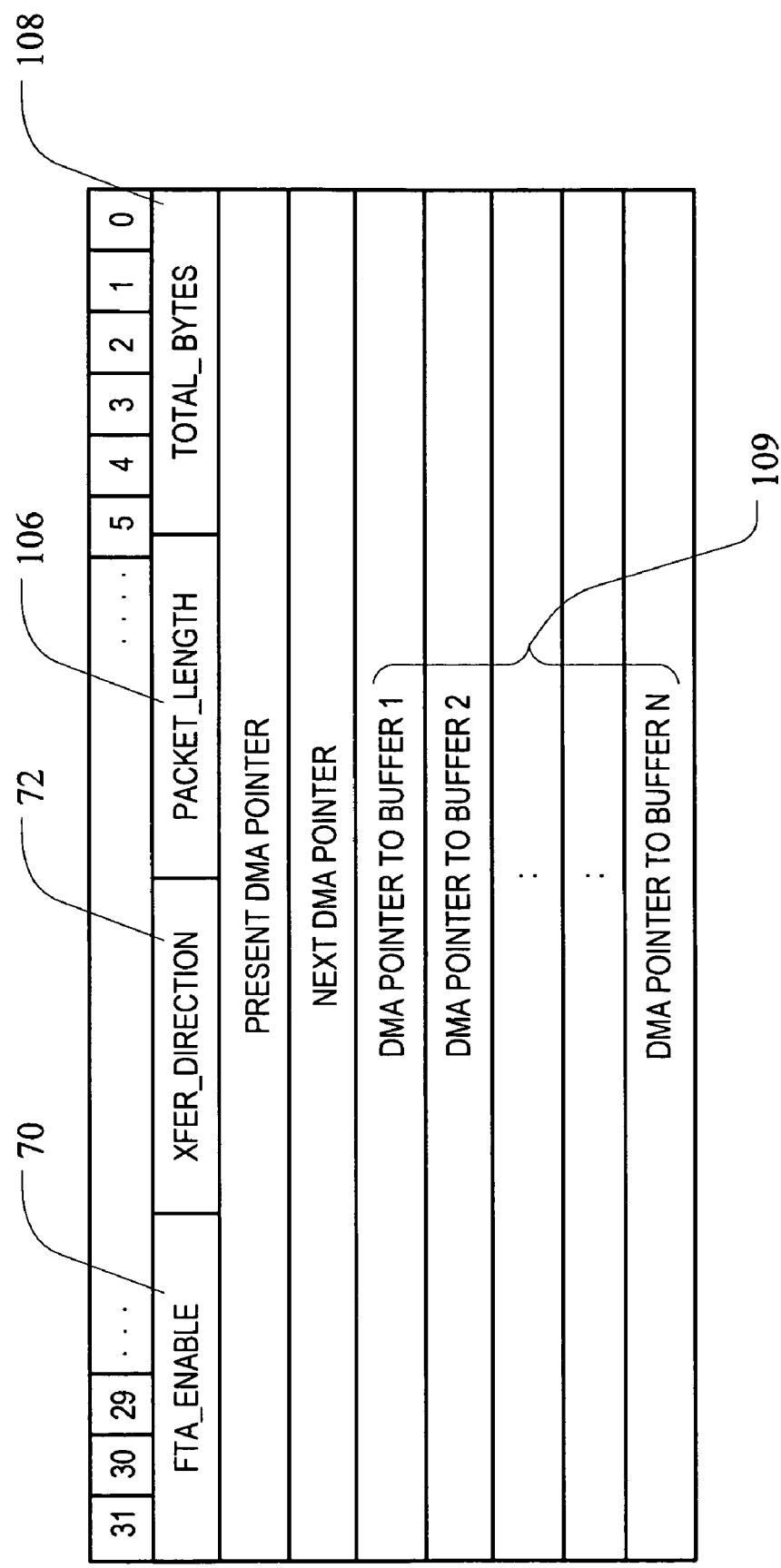
FIG. 6 is a data structure for use in bulk data transfer in the USB peripheral device of FIG. 1.

When enabling the FTA mode of the USB controller 16 and populating the FTA registers 46 with data shown in the data table 76 of FIG. 5, the USB controller 16 also prepares endpoint data transfer descriptor (dTD) and endpoint data queue head (dQH) data structures. In the initial data structure set-up, as shown in FIG. 6, the USB controller 16 also generates FTA enablement data that includes a fta_enable bit 70 flagging to the USB device core 30 that full transfer automation is to be enabled for a particular data transfer data exchange, as well as a xfer_direction bit 72 indicating the direction of transfer. The packet length 106 for the transaction and the total expected bytes 108 may also be recorded in the data structure, along with the DMA pointers 109 to the BRAM buffer addresses needed for each expected data packet. These data structures may be generated by hardware logic in the FTA module 48 of the HIM 18 or may be implemented in firmware executed by the CPU 24, Depending on the amount of data expected, more than one data structure may need to be generated to identify pointers 109 for each of the sets of addresses needed to handle all of the component data blocks in the bulk data transfer. The dTD and dQH data structure information is written to the location pointed to by Transfer Descriptor Link List Base Address 90 of the FTA register set with the appropriate offset to account for the sizes of dTD and dQH. The dTD and dQH data structures inform the DMA block 36 in the HIM 18 of the total transfer size, DMA source/destination address and other transfer information.

Figure 7:
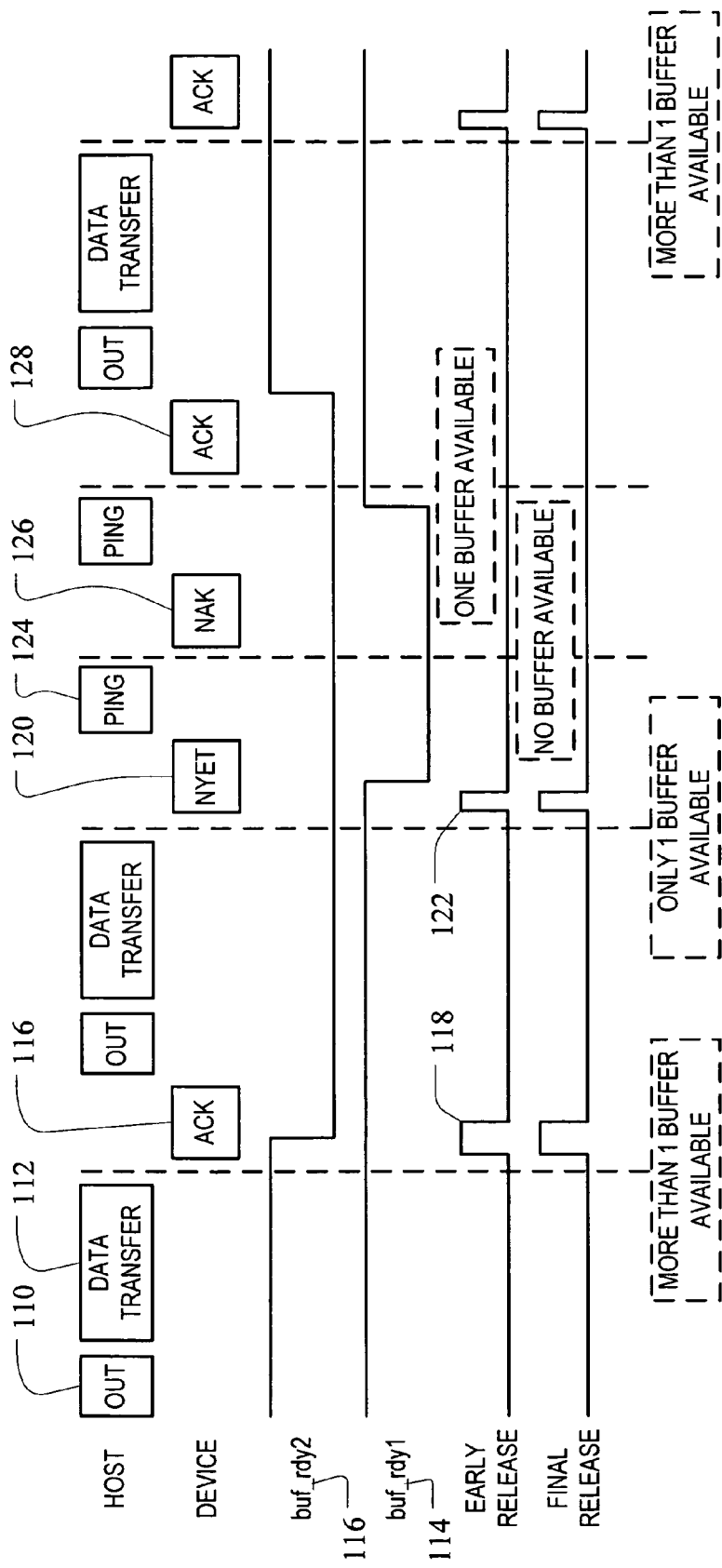
FIG. 7 is an example of a USB high speed bulk out transaction utilizing the USB peripheral device of FIG. 1.

Once the CBW message has been processed, where the dTD and dQH data has been set up and initial information in the FTA registers generated, the USB controller 16 is prepared to handle data transfer in FTA mode and eliminate or reduce firmware involvement in the bulk data transfer. As shown in FIG. 7, one possible high speed device bulk out transaction utilizing the FTA mode of the USB controller 16 is illustrated. This example illustrates the case where, to begin with, there are two buffers available in BRAM for supporting data transfer. The bulk out data transfer phase begins when a host 12 transmits an out token 110 followed by a data transfer 112 of a block of data, also referred to as a data packet. Assuming that the USB peripheral device 10 is operating in high speed mode, the data packet size may be 512 bytes. The USB peripheral device 10 receives the information at the HIM 18 and passes the data to the BMU 20 for storage in one of the buffers 58, 60 configured in the BRAM 56. The ABM 54 in the BMU 20 provides hardware logic generated signals, buf_rdy1 and buf_rdy2 114, 116, indicating that the buffers are ready to receive information. For a bulk out data transfer, the ABM 54 generates the buf_rdy1 and buf_rdy2 signals based on buffer counters that count the number of free buffers in BRAM. Any of a number of types of digital counter circuits may be used to form the buffer counters that produce the digital logic signals for buf_rdy1 and buf_rdy2. The buf_rdy1 signal indicates availability of at least one buffer in BRAM and buf_rdy2 indicates availability of two or more buffers in BRAM. The term buffer refers to, in this embodiment, contiguous 512 byte locations in BRAM.

Upon completion of transfer of the first packet of data to the buffer, the HIM 18 triggers the MAC controller 32 to send an acknowledgement (ACK) 116 message to the host 12 because buf_rdy2 and buf_rdy1 are both "1" (high) at the beginning of the transfer. Concurrently, the FTA module 48 in the HIM 18 generates via hardware an "early release" signal pulse that is communicated back to the BMU 20 to inform the BMU 20 that the transfer of the data packet is complete. In response to this release signal, BMU 20 asserts buf_rdy2 as low representative of the fact that two or more buffers are not available. In turn, the BMU may then instruct the FIM 22 to begin writing this data to the flash memory 26.

The next out token from the host is received at the USB peripheral device 10 and the accompanying data packet transfer places data in the second of the two dedicated buffers in BRAM 56. The HIM 18 interprets the combination of buf_rdy1 and buf_rdy2 in its state table at the beginning of the transfer and sends out a NYET handshake message 120 to the host 12 (buf_rdy2=0, buf_rdy1=1). Concurrently, the HIM 18 sends another early release signal 122 (or the identical final release signal) to the BMU 20 in the backend so that the BMU 20 knows that the transfer has completed. Upon noticing this release, the backend 52, via the BMU 20, sends a buf_rdy1 low signal in addition to the already low buf_rdy2 signal to indicate to the HIM 18 that no buffers 58, 60 are currently available. The NYET message 120 conveys to the host 12 that the immediately prior data transfer was received, but that the host 12 might not send more information without first checking on the status. In the scenario of FIG. 7, the host 12 sends a PING token 124 to the USB peripheral device 10. Noting that the buf_rdy2 and buf_rdy1 signals are both at logical lows, representing that no buffers are currently available, the HIM 18 responds with a NAK response 126. A subsequent PING from the host is received by the USB peripheral device as one of the buffers becomes available, signified by the logical high setting of buf_rdy1 generated by the ABM 54 hardware logic, and the HIM responds with an ACK response 128 notifying the host of the readiness to receive subsequent data.

In the example of FIG. 7, for a bulk out data transfer the buffer ready signals (buf_rdy2 and buf_rdy1) are hardware signals generated by the automatic buffer manager 44 in the BMU 20. The hardware implemented signals may be based on basic digital logic responsive to data occupying the first and second buffers 48, 50, where buf_rdy2 may be derived from a counter in the BMU 20 that maintains the count of valid buffers present in the BRAM 56. The ABM will assert a buf_rdy2 high signal if the count value from the counter exceeds a threshold value. The threshold value is configurable and may be set by firmware. In USB data transfers, the threshold value is set to 2. Additional hardware implemented logic in the ABM 54 generates a buf_rdy1 high signal when the count value of the counter in the BMU is greater than or equal to 1. Thus, the buf_rdy1 and buf_rdy2 handshake signals generated by the ABM and sent to the HIM are high when both buffers are ready, low when both buffers are not ready, and buf_rdy1 is high and buf_rdy2 is low when only one buffer is available. In one implementation the buf_rdy1 and buf_rdy2 signals are generated using counters to identify the number of free buffers in BRAM 56.

Figures 8, 9:
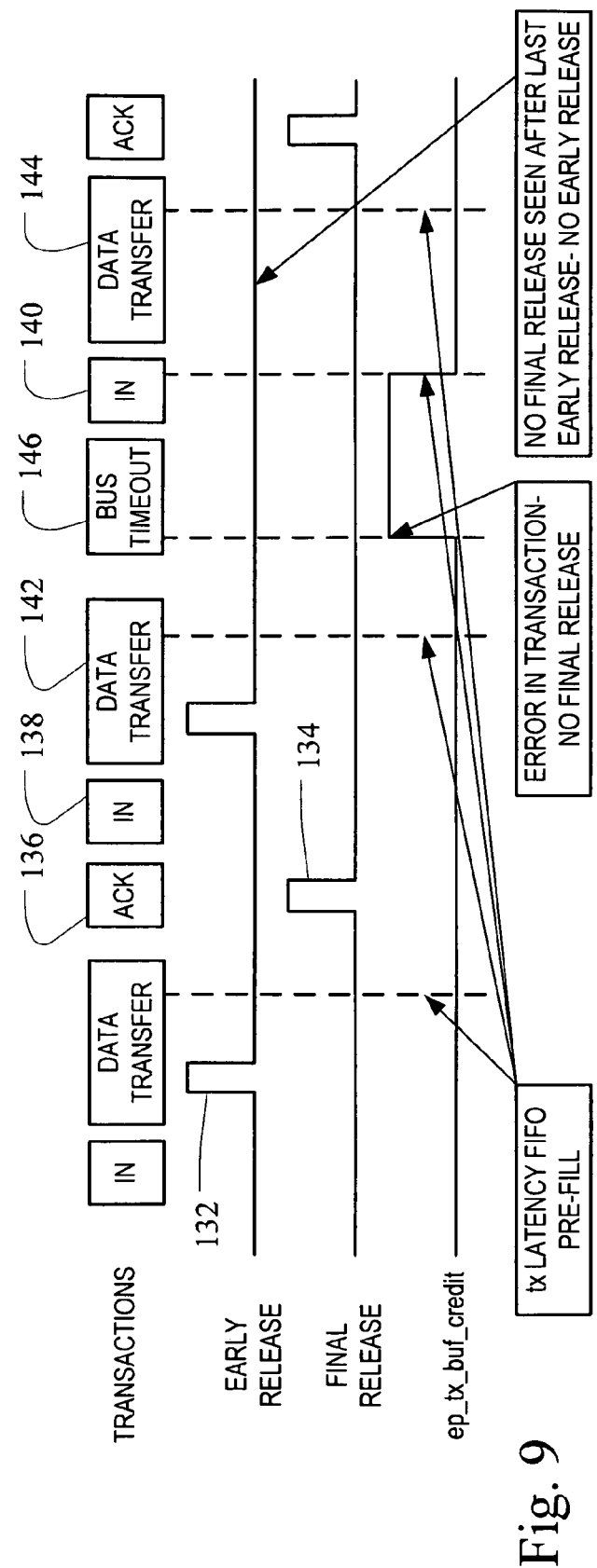
FIG. 8 is a state table illustrating logic for generating USB handshake packets in response to receipt of bulk data transfer tokens.
FIG. 9 is an example of a USB high speed bulk in transaction utilizing the USB peripheral device of FIG. 1.

The HIM 18 utilizes the buffer availability signals of buf_rdy1 and buf_rdy2 to generate responses to OUT and PING tokens received from the host 12. A state table 130 of the USB handshake packets generated by the USB controller 16 in response to the three valid combinations of buf_rdy1 and buf_rdy2 signals for an OUT token and for a PING token is shown in FIG. 8. An ACK response packet is generated by the HIM 18 in reply to either an OUT or a PING token when both buffers are ready (both availability signals at a logical high or 1). A NAK response packet is generated by the HIM 18 in reply to either an OUT or a PING token when both buffers are unavailable (both availability signals at a logical low or 0). The response packet generated differs for the OUT and PING tokens when only 1 buffer is ready: an ACK is generated for a PING and a NYET is generated for an OUT.

In the reverse direction, handshake signals from the HIM 18 to the BMU 20 in the backend 52 are also generated, the early release and final release signals are hardware generated logic signals that my be implemented as digital logic in the FTA module 38 of the HIM 18. The FTA module 38 bases the early release and final release handshake messages on different input information depending on whether the USB controller 16 is handling a bulk out data transfer, an example of which is seen in FIG. 7, or a bulk in data transfer, an example of which is shown in FIG. 9. For bulk out data transfers, the early release and final release signals are identical. In the case of a bulk out data transfer, the FTA module 48 derives the early release signal from the successful data packet transfer signal generated by the MAC controller 32 of the USB core 30. The successful data packet transfer signal, for a high speed USB bulk out transfer, is triggered as soon as a 512 byte packet is received. In the case of full speed or low speed USB bulk out transfers, where the data packet size may be 64 bytes, the MAC controller information is used to count 8 successful data packet transfers before the early release/final release signal is triggered.

Referring to FIG. 9, a bulk in transfer scenario is illustrated using the buffer availability (buf_rdy1 and buf_rdy2) and buffer release (early release and final release) hardware generated handshake messages discussed above. In the bulk in transfer, data is transferred from the flash memory in the USB peripheral device to the host. Similar to the bulk out transfer, a CBW message is received by the HIM 18, which places the CBW message in the BRAM 56 of the BMU 20. The HIM 18 then informs the CPU 24 that a CBW message has been received and the CPU 24 then reads the message from the BRAM 56 and initializes the FTA register 48 in the HIM. The data transfer descriptors and data queue heads necessary for the amount of data indicated in the CBW message is generated and the FIM 22 begins to read a packet of data from the flash memory 26 into a buffer of the BRAM 56. Again assuming a two buffer configuration in BRAM 46, as soon as the data from a first buffer is transmitted to the HIM from the BMU the HIM 18 sends an early release logic pulse to the BMU 20.

The early release hardware signal is generated by the FTA module 48. In this instance, the early release and final release hardware signals differ because the FTA module 48 derives the early release and final release signals separately. The early release signal is used by the BMU 20 to check buffer availability for prefilling transmit (read) data to the TX FIFO 44. If the BMU receives an early release signal when the buffer in BRAM is not ready, the BMU de-asserts the buf_rdy1 signal (i.e, the signal goes low) so that the HIM 18 is prevented from pre-fetching data from the buffer. In bulk in data transfers, the FTA module 48 generates an early release based on the logic signal generated in the MAC controller 32 when the HIM 18 starts sending read data from the TX FIFO 44 to the host 12. The final release signal confirms the early release and signals to the BMU that a packet may be finally released now that an ACK response has been received from a host. The final release signal is generated by the FTA module 48 based on a logic signal generated in the MAC controller 32 indicating receipt of the ACK from the host. Because these signals from the MAC controller 32 are generated in a different clock frequency domain than used by the ETA module 48, the FTA module also includes circuitry to convert the MAC controller 32 signals from the USB PHY clock domain of the MAC controller to the system clock domain in which the FTA module operates.

The first early release signal 132 in the bulk in transfer scenario of FIG. 9 indicates to the BMU 20 that it is now appropriate to fill in read data in the buffer space in the second BRAM buffer 50 if the buffer is available. Due to the typically slower data transfer rate between flash memory 26 and BRAM buffers 58, 60 than from the BRAM buffers 58, 60 through the HIM 18 to the host 12, the HIM 18 will pre-fetch data from the BRAM to the TX FIFO register 44 and simultaneously send data from the TX FIFO 44 register to the host 12. The final release hardware signal 134 is sent from the HIM 18 to the BMU 20 only after an ACK message 136 is received from the host indicative of a successful receipt of the previous data packet. Second and third IN tokens 138, 140 and data transfer packets 142, 144 are illustrated in FIG. 9. Between the second and third transfers, there is a bus timeout 146 generated within the USB peripheral device 10 because no ACK message was received by the USB peripheral device from the host. Because no acknowledgement was received from the host, a final release signal is not generated by the HIM and no early release signal is seen for the next transfer. This is because the same data from the second transfer must be sent again in absence of an acknowledgement that the first attempt was properly received. The above example assumes that the buf_rdy1 signal is always high indicating that flash memory 26 has completed a read operation and that valid data is available in a BRAM buffer. If the BMU determined that the buffer is not ready for some reason, a buf_rdy1 signal would remain low and the HIM 18 would transmit a NAK handshake packet to the host based on this buf_rdy1 low signal.

At the conclusion of the USB bulk data in or out transfer, the FTA engine 48 automatically stops the transfer when the transfer size 86 is reached. A request for a CSW message is received from the host also at the end of a bulk transfer. In response, firmware prepares CSW and sends it back to the host also at the end of a bulk transfer. This implementation does not block transfers to other endpoints while FTA enabled bulk data transfer goes on.

Illustrated in both the bulk out transfer and bulk in transfer scenarios is the use of hardware signals generated in the HIM 18 and in the BMU 20 that provide a hardware handshake to increase the ability for the USB peripheral device to read and write data. No firmware interrupts requiring CPU intervention are used or necessary for each burst of data. Transferring data in or out of the flash memory, and the USB peripheral device in general, without the need to engage and interrupt, avoids the time necessary for the interrupt to be triggered, read by the CPU, and acted upon. As logically follows, a CPU will not need to be active during this phase of data transfer and thus may save overall power usage by the USB peripheral device.

Another advantage of using hardware handshakes to communicate between the backend and the HIM regarding the availability of buffer space is that memory size in the buffer may be maintained at a lower level, freeing up the otherwise blocked out buffer memory for other uses. Additionally, without the need for interrupts and CPU intervention, the CPU overhead is reduced and CPU clock speed may be reduced in comparison to implementations where firmware is necessary to track data transfer and manage buffer space. A lower clock speed implementation based on the lower CPU overhead may also contribute to additional power savings.

Although examples have been provided of a backend 52 in a USB controller 16 where two buffers have been allocated to implement the FTA mode for bulk data transfer operations, in other implementations only a single buffer may be used. The buffer may be the size of a single data transfer block (packet). Alternatively, the USB controller and methods described above are equally adaptable to using more than two buffers in BRAM where each of the buffers may be the same size as a data packet. In other implementations, for example when running the USB peripheral in full speed mode or low speed mode (12 Megabits per second or 1.5 Megabits per second, respectively, rather than the 480 Megabits per second of high speed mode), the FTA mode of operation may be adjusted to account for the 64 byte data packet size supported in full speed or low speed modes. In yet other implementations, the USB peripheral 10 may be configured to behave as a host and utilize the same FTA mode for bulk transfer operations as described. Also, although specific data packet sizes were discussed, for example 512 bytes for high speed and 64 bytes for full and low speeds, this size of data processed by the back-end may be set for other lengths in accordance with the flash memory type selected for use in the backend of the USB peripheral device.

The entirety of the following concurrently filed (Dec. 31, 2006), commonly owned U.S. patent applications are incorporated herein by reference: U.S. application Ser. No. 11/649,325 entitled "Selectively Powering Data Interfaces"; U.S. application Ser. No. 11/649,326 entitled "Selectively Powered Data Interfaces"; U.S. application Ser. No. 60/934,923 entitled "Internally Protecting Lines at Power Island Boundaries"; U.S. application Ser. No. 60/999,760 entitled "Integrated Circuit with Protected Internal Isolation"; U.S. application Ser. No. 60/934,917 entitled "Updating Delay Trim Values"; U.S. application Ser. No. 60/934,918 entitled "Module with Delay Trim Value Updates on Power-Up"; U.S. application Ser. No. 60/921,507 entitled "Limiting Power Island Inrush Current"; U.S. application Ser. No. 60/934,936 entitled "Systems and Integrated Circuits with Inrush-Limited Power Islands"; U.S. application Ser. No. 11/618,867 entitled "USB Controller with Full Transfer Automation"; U.S. application Ser. No. 11/618,849 entitled "Method for Configuring a USB PHY to Loopback Mode"; and U.S. application Ser. No. 11/618,852 entitled "Apparatus for Configuring a USB PHY to Loopback Mode".

From the foregoing, a method and apparatus for implementing full transfer automation in a USB controller has been described. Four new hardware generated logic signals internal to a USB controller in a USB peripheral device have been provided for a handshake between a host interface module and a backend module. The internal handshake signals, generated via hardware logic rather than through use of firmware and microprocessor time, may improve data transfer speed and reduce power consumption by the USB controller.

It is therefore intended that the foregoing detailed description be regarded as illustrative rather than limiting, and that it be understood that it is the following claims, including all equivalents, that are intended to define the spirit and scope of this invention.

We claim:

1. A method of implementing full transfer automation in a Universal Serial Bus (USB) controller, the method comprising:

receiving a USB bulk data transfer initiation message at a USB controller from a host;

transferring data packets during a USB bulk data transfer operation; and exchanging hardware generated logic signals directly between a host interface module and a backend module of the USB controller during a data transfer phase of the bulk data transfer operation, relating to a data transfer status within the USB controller, wherein the hardware generated logic signals are not stored as intermediate data between the host interface module and the backend module of the USB controller.

2. The method of claim 1, wherein exchanging hardware generated logic signals comprises:

generating at least one backend hardware logic signal in the backend module of the USB controller indicative of a readiness of a buffer memory to transfer data in or out of a mass storage media during the USB bulk data transfer operation; and generating at least one host interface module hardware logic signal in the host interface module of the USB controller wherein during a USB bulk data transfer read or write operation the backend module and host interface module are configured to communicate with each other via the backend and host interface module hardware logic signals relating to the data transfer status within the USB controller.

3. The method of claim 2, wherein the USB bulk data transfer read or write operation comprises a data transfer of data in a plurality of discrete portions, each of the discrete portions having a having a fixed length, and wherein the at least one backend hardware logic signal comprises a readiness of the buffer memory to process one of the plurality of discrete portions.

4. The method of claim 3, wherein the buffer memory comprises at least one buffer having a buffer size equal to the fixed length.

5. The method of claim 3, wherein generating at least one backend hardware logic signal comprises communicating to the host interface module that at least one buffer is available for receiving one of the plurality of discrete portions during a USB bulk data transfer write operation.

6. The method of claim 3, wherein the buffer comprises a first buffer and a second buffer, each of the first and second buffers having a buffer size equal to the fixed length, and wherein generating at least one backend hardware logic signal comprises generating a first buffer readiness hardware logic signal when only one buffer of the first and second buffers is available for receiving one of the plurality of discrete portions during a USB bulk data transfer write operation, and generating a second buffer readiness hardware logic signal when at least two buffers are available for receiving one of the plurality of discrete portions during a USB bulk data transfer write operation.

7. The method of claim 6, further comprising generating a USB handshake message in response to receipt of a USB token packet received from the host, and based on the first and second buffer readiness hardware logic signals received from the backend module.

8. The method of claim 4, further comprising transmitting a buffer readiness hardware logic signal from the backend module to the host interface module when at least one buffer is available to receive one of the plurality of discrete portions during a USB bulk data transfer read operation.

9. The method of claim 8, further comprising transmitting an early buffer release hardware logic signal from the host interface module to the backend module during a bulk data transfer read operation in response to initiating transfer of data from a FIFO buffer in the host interface module to the host.

10. The method of claim 9, further comprising transmitting a final buffer release hardware logic signal from the host interface module to the backend module during a bulk data transfer read operation in response to receipt of an acknowledgement handshake token from the host.

11. The method of claim 9, further comprising transmitting a buffer readiness hardware logic signal from the backend module to the host interface module indicative of an availability of the at least one buffer for transmitting one of the plurality of discrete portions during a USB bulk data transfer read operation, and initiating a pre-fetch of data from the buffer memory to the FIFO buffer during a bulk data transfer read operation if the buffer readiness hardware signal indicates readiness of the buffer after receipt by the backend of the early buffer release hardware logic signal.

12. A method of implementing full transfer automation in a Universal Serial Bus (USB) controller, the method comprising:

receiving a USB bulk data transfer initiation message for a USB bulk transfer write operation at the USB controller from a host and initializing a full transfer automation mode within the USB controller;

receiving data packets from the host at the USB controller during the USB bulk transfer write operation; and exchanging hardware generated logic signals directly between a host interface module and a backend module of the USB controller relating to a data transfer status within the USB controller while receiving the data packets, wherein the hardware generated logic signals are not stored as intermediate data between the host interface module and the backend module of the USB controller.

13. The method of claim 12, wherein receiving data packets comprises receiving data in a plurality of discrete portions, each of the discrete portions having a fixed length, and wherein exchanging hardware generated logic signals comprises transmitting at least one buffer readiness hardware logic signal from the backend module to the host interface module.

14. The method of claim 13, wherein transmitting at least one buffer readiness hardware signal comprises transmitting to the host interface module a first buffer readiness hardware logic signal when only one buffer is available in the backend module for receiving one of the plurality of discrete portions during a USB bulk transfer write operation, and transmitting to the host interface module a second buffer readiness hardware logic signal when at least two buffers are available in the backend module for receiving one of the plurality of discrete portions during a USB bulk transfer write operation.

15. The method of claim 14, wherein exchanging hardware logic signals further comprises transmitting a buffer release hardware logic signal from the host interface module to the backend module when a complete data packet has been received at the host interface module.

16. The method of claim 15, wherein transmitting the buffer release hardware logic signal comprises transmitting the buffer release hardware logic signal upon receipt by the host interface module of a USB ACK handshake message.

17. A method of implementing full transfer automation in a Universal Serial Bus (USB) controller, the method comprising:

receiving a USB bulk data transfer initiation message for a USB bulk transfer read operation at the USB controller from a host and initializing a full transfer automation mode within the USB controller;

transmitting data packets to the host from the USB controller during the USB bulk transfer read operation; and exchanging hardware generated logic signals directly between a host interface module and a backend module of the USB controller relating to a data transfer status within the USB controller while transmitting the data packets, wherein the hardware generated logic signals are not stored as intermediate data between the host interface module and the backend module of the USB controller.

18. The method of claim 17, wherein transmitting data packets comprises transmitting data in a plurality of discrete portions, each of the discrete portions having a fixed length, and wherein exchanging hardware generated logic signals comprises transmitting at least one buffer release hardware logic signal from the host interface module to the backend module.

19. The method of claim 18, wherein transmitting at least one buffer release hardware logic signal comprises transmitting to the backend module a first buffer release hardware logic signal when the host interface module begins transmitting a data packet to the host and transmitting a second buffer release hardware logic signal when transmission of the data packet is complete.

20. The method of claim 19, further comprising the backend module transmitting a buffer readiness hardware logic signal to the host interface module indicating when a buffer in the backend is ready to transfer data to the host interface unit.

21. A Universal Serial Bus (USB) controller for use in a USB peripheral device, the USB controller comprising:
   a backend module having buffer memory configured to transfer data in or out of a mass storage media; and
   a host interface module in communication with the backend module and configured to communicate with a host, wherein during a USB bulk data transfer read or write operation the backend module and host interface module are configured to communicate directly with each other via hardware logic signals relating to a data transfer status within the USB controller, wherein the hardware logic signals relating to the data transfer status are not stored as intermediate data between the host interface module and the backend module.

22. The USB controller of claim 21, wherein the USB bulk data transfer read or write operation comprises a data transfer of data in a plurality of discrete portions, each of the discrete portions having a having a fixed length, and wherein the data transfer status comprises a readiness of the buffer memory to process one of the plurality of discrete portions.

23. The USB controller of claim 22, wherein the buffer memory comprises at least one buffer having a buffer size equal to the fixed length.

24. The USB controller of claim 23, wherein the backend module comprises hardware logic configured to communicate a buffer readiness hardware logic signal to the host interface module indicative of an availability of the at least one buffer for receiving one of the plurality of discrete portions during a USB bulk data transfer write operation.

25. The USB controller of claim 22, wherein the buffer memory comprises a first buffer and a second buffer, each of the first and second buffers having a buffer size equal to the fixed length, and wherein the backend module comprises hardware logic configured to communicate a first buffer readiness hardware logic signal to the host interface module indicative of an availability of only one buffer of the first and second buffers for receiving one of the plurality of discrete portions during a USB bulk data transfer write operation, and a second buffer readiness hardware logic signal to the host interface module indicative of an availability of at least two buffers for receiving one of the plurality of discrete portions during a USB bulk data transfer write operation.

26. The USB controller of claim 25, wherein the host interface module comprises USB handshake packet generating logic responsive to USB token packets received from the host, and to first and second buffer readiness hardware logic signals received from the backend module, to generate a USB handshake packet for transmission to the host.

27. The USB controller of claim 21, wherein the host interface module comprises:
   a direct memory access (DMA) block arranged to manage data transfer into and out of the buffer; and
   a MAC controller in communication with the DMA block, the MAC controller arranged to format and generate USB handshake and data response packets for communication to the host.

28. The USB controller of claim 23, wherein the backend module comprises hardware logic configured to communicate a buffer readiness hardware logic signal to the host interface module indicative of an availability of the at least one buffer for receiving one of the plurality of discrete portions during a USB bulk data transfer read operation.

29. The USB controller of claim 28, wherein the host interface module comprises a FIFO buffer and is configured to generate an early buffer release hardware logic signal to the backend module during a bulk data transfer read operation in response to initiating transfer of data from the FIFO buffer to the host.

30. The USB controller of claim 29, wherein the host interface module is configured to generate a final buffer release hardware logic signal to the backend module during a bulk data transfer read operation in response to receipt of an acknowledgement handshake token from the host.

31. The USB controller of claim 29, wherein the backend module comprises hardware logic configured to communicate a buffer readiness hardware logic signal to the host interface module indicative of an availability of the at least one buffer for transmitting one of the plurality of discrete portions during a USB bulk data transfer read operation, and wherein the host interface module is further configured to initiate a pre-fetch of data from the buffer memory to the FIFO buffer during a bulk data transfer read operation if the buffer readiness hardware signal indicates readiness of the buffer after receipt by the backend of the early buffer release hardware logic signal.

32. The USB controller of claim 25, wherein the fixed length of the buffer size is 512 bytes.

33. The USB controller of claim 25, wherein the first and second buffers comprise contiguous memory space.

34. A Universal Serial Bus (USB) peripheral device, the USB peripheral device comprising:
   mass storage media adapted for receiving data from or providing data to a host; and
   a USB controller comprising:
      a backend module having buffer memory configured to transfer data in or out of the mass storage media; and
      a host interface module in communication with the backend module and configured to communicate with the host, wherein during a USB bulk data transfer read or write operation the backend module and host interface module are configured to communicate directly with each other via hardware logic signals relating to a data transfer status within the USB controller, wherein the hardware logic signals are not stored as intermediate data between the host interface module and the backend module.

35. The USB peripheral device of claim 34, wherein the USB bulk data transfer read or write operation comprises a data transfer of data in a plurality of discrete portions, each of the discrete portions having a having a fixed length, and wherein the data transfer status comprises a readiness of the buffer memory to process one of the plurality of discrete portions.

36. The USB peripheral device of claim 35, wherein the buffer memory comprises at least one buffer having a buffer size equal to the fixed length.

37. The USB peripheral device of claim 36, wherein the backend module comprises hardware logic configured to communicate a buffer readiness hardware logic signal to the host interface module indicative of an availability of the at least one buffer for receiving one of the plurality of discrete portions during a USB bulk data transfer write operation.

38. The USB peripheral device of claim 35, wherein the buffer memory comprises a first buffer and a second buffer, each of the first and second buffers having a buffer size equal to the fixed length, and wherein the backend module comprises hardware logic configured to communicate a first buffer readiness hardware logic signal to the host interface module indicative of an availability of only one buffer of the first and second buffers for receiving one of the plurality of discrete portions during a USB bulk data transfer write operation, and a second buffer readiness hardware logic signal to the host interface module indicative of an availability of both the first and second buffers for receiving one of the plurality of discrete portions during a USB bulk data transfer write operation.

39. The USB peripheral device of claim 38, wherein the host interface module comprises USB handshake packet generating logic responsive to USB token packets received from the host, and to first and second buffer readiness hardware logic signals received from the backend module, to generate a USB handshake packet for transmission to the host.

40. The USB peripheral device of claim 34, wherein the mass storage media memory comprises non-volatile memory.

41. The USB peripheral device of claim 40, wherein the non-volatile memory comprises flash memory.

* * * * *

UNITED STATES PATENT AND TRADEMARK OFFICE
CERTIFICATE OF CORRECTION

PATENT NO.        : 7,802,034 B2
APPLICATION NO.   : 11/618865
DATED             : September 21, 2010
INVENTOR(S)       : Baojing Liu et al.

Page 1 of 4

It is certified that error appears in the above-identified patent and that said Letters Patent is hereby corrected as shown below:

In the Claims
Please replace claims 1, 2, 6, 12, 17, 21, 23-25, 27, 28, 31, 34 and 36-38 with the following:

Col. 10, lines 41-67
1.      A method of implementing full transfer automation in a Universal Serial Bus
(USB) controller, the method comprising:
        receiving a USB bulk data transfer initiation message at a USB controller
from a host;
        transferring data packets during a USB bulk data transfer operation; and
        exchanging hardware generated logic signals between a host interface module and a backend module of the USB controller during a data transfer phase of the bulk data transfer operation, relating to a data transfer status within the USB controller, wherein the hardware generated logic signals include a first logic signal based on a number of free data buffers in a buffer memory, and wherein a count of the number of free data buffers is received from a hardware counter that is responsive to whether data occupies at least a first and a second of a plurality of data buffers in the buffer memory, and wherein the count is a count of a number of data buffers, among the plurality of data buffers, that are free to accept data.

2.      The method of claim 1, wherein exchanging hardware generated logic
signals comprises:
        generating at least one backend hardware logic signal in the backend module of the USB controller indicative of a readiness of the buffer memory to transfer data in or out of a mass storage media during the USB bulk data transfer operation; and
        generating at least one host interface module hardware logic signal in the host interface module of the USB controller wherein during a USB bulk data transfer read or write operation the backend module and host interface module are configured to communicate with each other via the backend and host interface module hardware logic signals relating to the data transfer status within the USB controller.

Signed and Sealed this
Seventeenth Day of April, 2012

David J. Kappos
*Director of the United States Patent and Trademark Office*

CERTIFICATE OF CORRECTION (continued)
U.S. Pat. No. 7,802,034 B2

Col. 11, line 19 - Col. 12, line 11

6. The method of claim 3, wherein the buffer comprises a first buffer and a second buffer, each of the first and second data buffers have a buffer size equal to the fixed length, and wherein generating at least one backend hardware logic signal comprises generating a first buffer readiness hardware logic signal when only one buffer of the first and second data buffers is available for receiving one of the plurality of discrete portions during a USB bulk data transfer write operation, and generating a second buffer readiness hardware logic signal when at least two buffers are available for receiving one of the plurality of discrete portions during a USB bulk data transfer write operation.

12. A method of implementing full transfer automation in a Universal Serial Bus (USB) controller, the method comprising:
    receiving a USB bulk data transfer initiation message for a USB bulk transfer write operation at the USB controller from a host and initializing a full transfer automation mode within the USB controller;
    receiving data packets from the host at the USB controller during the USB bulk transfer write operation; and
    exchanging hardware generated logic signals between a host interface module and a backend module of the USB controller relating to a data transfer status within the USB controller while receiving the data packets, wherein the hardware generated logic signals include a first logic signal based on a number of free data buffers in a buffer memory, and wherein a count of the number of free data buffers is received from a hardware counter that is responsive to data occupying at least a first and a second of a plurality of data buffers in the buffer memory, and wherein the count is a count of a number of data buffers, among the plurality of data buffers, that are free to accept data.

Col. 17, lines 39-56

17. A method of implementing full transfer automation in a Universal Serial Bus (USB) controller, the method comprising:
    receiving a USB bulk data transfer initiation message for a USB bulk transfer read operation at the USB controller from a host and initializing a full transfer automation mode within the USB controller;
    transmitting data packets to the host from the USB controller during the USB bulk transfer read operation; and
    exchanging hardware generated logic signals between a host interface module and a backend module of the USB controller relating to a data transfer status within the USB controller while transmitting the data packets, wherein the hardware generated logic signals include a first logic signal based on a number of free data buffers in a buffer memory, and wherein a count of the number of free data buffers is received from a hardware counter that is responsive to data occupying at least a first and a second of a plurality of data buffers in the buffer memory, and wherein the count is a count of a number of data buffers, among the plurality of data buffers that are free to accept data.

CERTIFICATE OF CORRECTION (continued)
U.S. Pat. No. 7,802,034 B2

Col. 13, lines 8-21

21. A Universal Serial Bus (USB) controller for use in a USB peripheral device, the USB controller comprising:

a backend module having buffer memory configured to transfer data in or out of a mass storage media, wherein the buffer memory includes a plurality of data buffers;

a host interface module in communication with the backend module and configured to communicate with a host, wherein during a USB bulk data transfer read or write operation the backend module and host interface module are configured to communicate with each other via hardware logic signals, including at least a first hardware logic signal, relating to a data transfer status within the USB controller; and a hardware counter to count a number of free data buffers of the plurality of data buffers, wherein the hardware counter is responsive to data occupying at least a first and a second of the plurality of data buffers, and wherein the backend module comprises hardware logic to generate the first hardware logic signal based on the number of free data buffers.

Col. 13, line 28 - Col. 14, line 2

23. The USB controller of claim 22, wherein the buffer memory comprises at least one data buffer having a buffer size equal to the fixed length.

24. The USB controller of claim 23, wherein the hardware logic is configured to communicate a buffer readiness hardware logic signal to the host interface module indicative of an availability of the at least one data buffer for receiving one of the plurality of discrete portions during a USB bulk data transfer write operation.

25. The USB controller of claim 22, wherein each of the first and second data buffers have a buffer size equal to the fixed length, and wherein the hardware logic is configured to communicate a first buffer readiness hardware logic signal to the host interface module indicative of an availability of only one buffer of the first and second data buffers for receiving one of the plurality of discrete portions during a USB bulk data transfer write operation, and a second buffer readiness hardware logic signal to the host interface module indicative of an availability of at least two buffers for receiving one of the plurality of discrete portions during a USB bulk data transfer write operation.

27. The USB controller of claim 21, wherein the host interface module comprises:

a direct memory access (DMA) block arranged to manage data transfer into and out of the buffer; and a MAC (media access control) controller in communication with the DMA block, the MAC controller arranged to format and generate USB handshake and data response packets for communication to the host.

28. The USB controller of claim 23, wherein the hardware logic is configured to communicate a buffer readiness hardware logic signal to the host interface module indicative of an availability of the at least one data buffer for receiving one of the plurality of discrete portions during a USB bulk data transfer read operation.

CERTIFICATE OF CORRECTION (continued)
U.S. Pat. No. 7,802,034 B2

Col. 14, lines 14-56

31. The USB controller of claim 29, wherein the hardware logic is configured to communicate a buffer readiness hardware logic signal to the host interface module indicative of an availability of the at least one data buffer for transmitting one of the plurality of discrete portions during a USB bulk data transfer read operation, and wherein the host interface module is further configured to initiate a prefetch of data from the buffer memory to the FIFO buffer during a bulk data transfer read operation if the buffer readiness hardware signal indicates readiness of the buffer after receipt by the backend of the early buffer release hardware logic signal.

34. A Universal Serial Bus (USB) peripheral device, the USB peripheral device comprising:
    mass storage media adapted for receiving data from or providing data to a host; and
    a USB controller comprising:
    a backend module having buffer memory configured to transfer data in or out of the mass storage media, wherein the buffer memory includes a plurality of data buffers;
    a host interface module in communication with the backend module and configured to communicate with the host, wherein during a USB bulk data transfer read or write operation the backend module and host interface module are configured to communicate with each other via hardware logic signals, including at least a first hardware logic signal, relating to a data transfer status within the USB controller; and
    a hardware counter to count a number of free data buffers of the plurality of data buffers, wherein the hardware counter is responsive to data occupying at least a first and a second of the plurality of data buffers, and wherein the backend module comprises hardware logic to generate the first hardware logic signal based on the number of free data buffers.

36. The USB peripheral device of claim 35, wherein the buffer memory comprises at least one data buffer having a buffer size equal to the fixed length.

Col. 14, line 57 - Col. 15, line 9

37. The USB peripheral device of claim 36, wherein the hardware logic is configured to communicate a buffer readiness hardware logic signal to the host interface module indicative of an availability of the at least one buffer for receiving one of the plurality of discrete portions during a USB bulk data transfer write operation.

38. The USB peripheral device of claim 35, wherein each of the first and second data buffers have a buffer size equal to the fixed length, and wherein the hardware logic is configured to communicate a first buffer readiness hardware logic signal to the host interface module indicative of an availability of only one buffer of the first and second data buffers for receiving one of the plurality of discrete portions during a USB bulk data transfer write operation, and a second buffer readiness hardware logic signal to the host interface module indicative of an availability of both the first and second buffers for receiving one of the plurality of discrete portions during a USB bulk data transfer write operation.